Oct. 30, 1934.  J. C. GLENN  1,978,747
STOVE
Filed Dec. 22, 1931   2 Sheets-Sheet 1
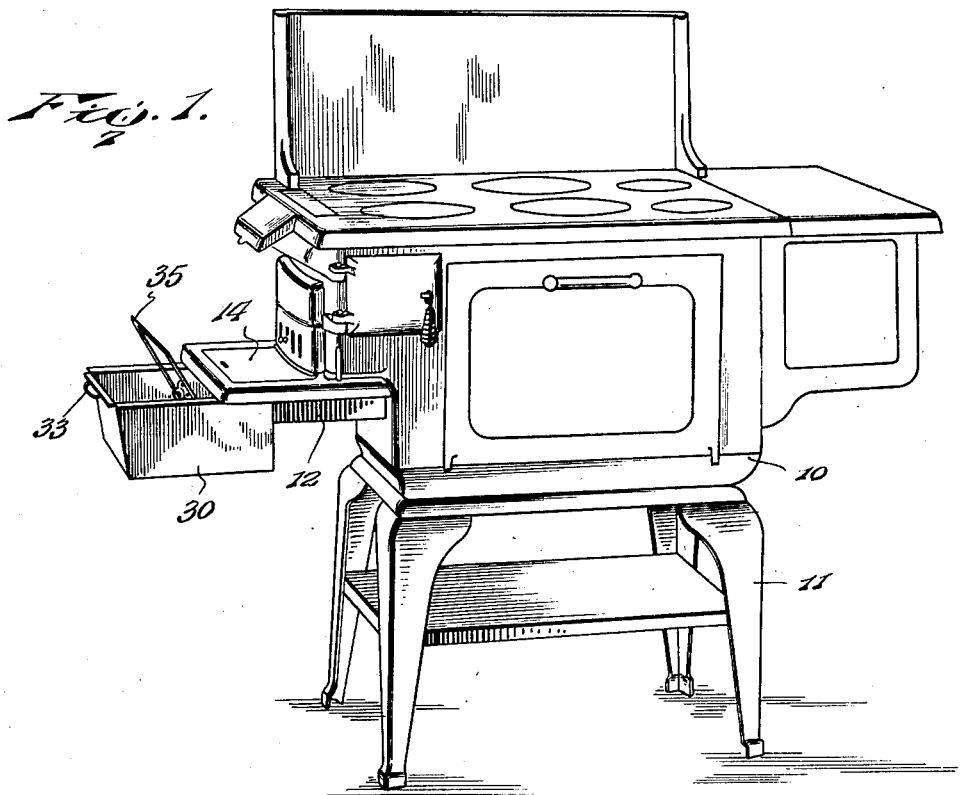
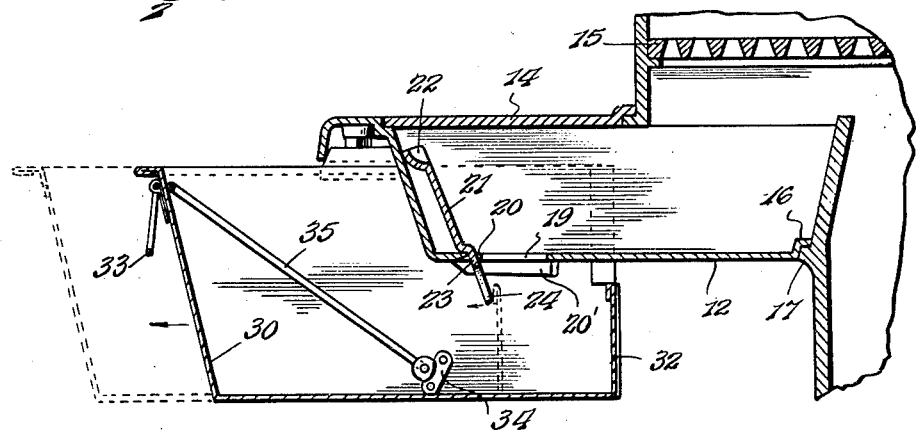
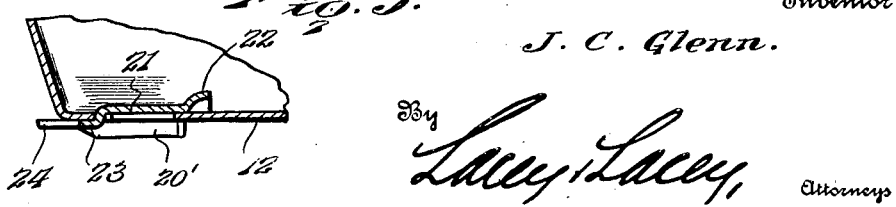
Inventor
J. C. Glenn.
By Lacey & Lacey,
Attorneys Oct. 30, 1934.  J. C. GLENN  1,978,747
STOVE
Filed Dec. 22, 1931   2 Sheets-Sheet 2
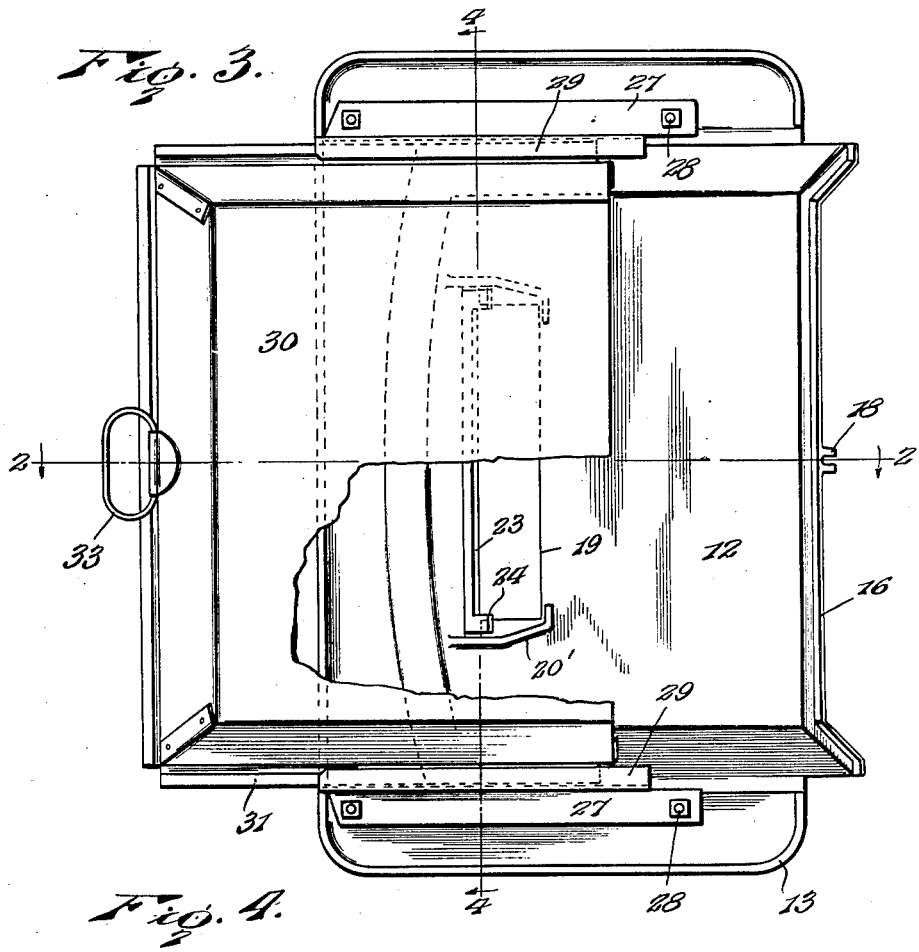
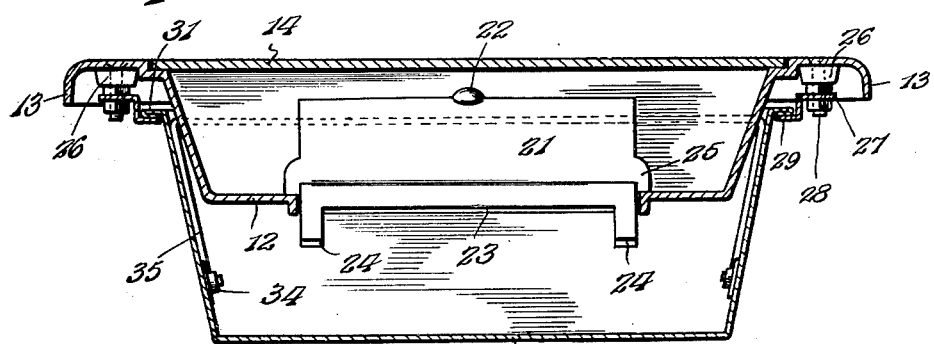
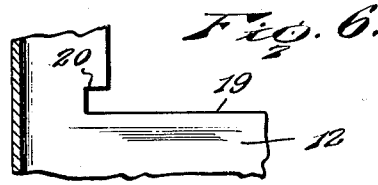

Patented Oct. 30, 1934

1,978,747

UNITED STATES PATENT OFFICE 1,978,747

STOVE

James Cleva Glenn, Cleveland, Tenn., assignor, by mesne assignments, to Hardwick Stove Company, Cleveland, Tenn., a corporation of Delaware Application December 22, 1931, Serial No. 582,629

4 Claims. (Cl. 126—242)

This invention relates to improvements in stoves and while being particularly designed for cooking stoves is also adapted for heating stoves.

The invention seeks, among other objects, to provide a stove embodying a hearth carrying a removable ash pan so that the pan may be displaced and emptied without the necessity of shoveling ashes directly from the hearth.

The invention seeks, as a further object, to provide the hearth with a discharge opening through which the ashes may be raked into the ash pan and wherein, when the pan is removed, said opening will be automatically closed to prevent any ashes remaining in the hearth from falling onto the floor.

And the invention seeks, as a still further object, to provide a pan having handles so arranged thereon that the pan may be readily removed and easily carried without danger of spilling the ashes therefrom.

Other and incidental objects, not specifically mentioned in the foregoing, will appear in the course of the following description.

In the drawings,

Figure 1 is a perspective view showing a cooking stove equipped with the present improvements, Fig. 2 is a fragmentary longitudinal sectional view showing the ash pan partially removed, Fig. 3 is a bottom plan view of the hearth and pan, the pan being partially broken away, Fig. 4 is a transverse sectional view on the line 4—4 of Fig. 3, particularly showing the ash door, Fig. 5 is a detail sectional view showing the ash door closed, Fig. 6 is a fragmentary plan view showing the notches at the ends of the discharge opening of the hearth, in which notches the door is pivoted.

Referring now more particularly to the drawings, I have shown the present improvements in connection with a cooking stove 10 mounted on a base 11. The detail construction of the stove body is not important. The stove is equipped with a hearth 12 which is provided with a roll rim 13 and normally closed by a removable hearth plate 14. As shown in Fig. 2, the hearth extends beneath the stove grate 15 so as to receive ashes dropping through the grate. The particular manner in which the hearth is connected to the stove body is also not important. It may be noted, however, that the hearth is provided, at its inner end, with a flange 16 to coact with a flange 17 on the stove body and, as shown in Fig. 3, is further equipped with ears 18 to receive a securing bolt.

Formed in the bottom wall of the hearth, near the outer end thereof, is a transversely extending discharge opening 19 provided, at its outer corners, as shown in Fig. 6, with longitudinally extending notches 20, reinforcing ribs 20' constituting a depending spout being provided on the lower side of said wall at the ends of said opening. In conjunction with the discharge opening, I provide an ash door 21 which is formed, at its forward edge, with a lip 22 to facilitate the opening of the door while, at its rear edge, the door is provided with a downwardly offset flange 23 extending from end to end of the door. Projecting rearwardly from the ends of said flange are lugs 24 and projecting longitudinally from the ends of the door, at its rear corners, are ears 25. As particularly shown in Fig. 4, the lugs 24 project freely through the notches 20 while the ears 25 overlie the bottom wall of the hearth at the ends of the discharge opening 19 for swingingly connecting the door with said wall so that the door may be swung to closed position overlying said opening when the flange 23 will project beneath said wall abutting thereagainst while the ears 25 will lie flat against the inner face of the wall. When the door is swung upwardly to open position, however, it is to be particularly noted that the lugs 24 project downwardly beneath the hearth.

Formed on the rim 13, at the sides of the hearth, are pairs of spaced depending bosses 26 and fixed to said bosses are preferably sheet metal tracks 27 substantially Z-shaped in cross section. These tracks are secured by bolts 28 extending through the bosses and are provided with flanges 29 which project inwardly toward the sides of the hearth. Slidable on said flanges is a removable ash pan 30 which is also preferably of sheet metal. The pan is formed to embrace the hearth and is provided, at the upper edges of the side walls thereof, with out turned flanges 31 to slidably coact with the flanges 29 of the tracks 27 while, as particularly seen in Fig. 2, the forward end wall 32 of the pan is shortened or cut away to clear the hearth so that the pan may be readily removed. Swingingly connected to the forward end of the pan is a handle 33 and secured to the side wall of the pan, at the bottom thereof, are medially arranged brackets 34 to which are swingingly connected the ends of a bail or handle 35 normally resting against the outer end of the pan within the lines thereof.

The door 21 normally stands open so that, as will now be seen, by removing the hearth plate 14, ashes collected in the hearth may be raked forwardly to discharge through the opening 19 into the ash pan 30. The handle 33 may then be grasped and the pan withdrawn when, as shown by dotted lines in Fig. 2, the end wall 32 of the pan will engage the lugs 24 of the door for swinging the door to closed position overlying the discharge opening. Thus the door will be automatically closed as the pan is removed so as to prevent any residue of the ashes remaining in the hearth from falling onto the floor when the pan is displaced and, as will be noted, when the pan is partially withdrawn, the handle 35 will be exposed so that, assuming the right hand is engaged with the handle 33, the left hand may be engaged with the handle 35 for carrying the pan. As will be perceived, the pan may thus be nicely balanced so as to prevent the spilling of ashes therefrom.

Having thus described the invention, I claim,

1. In a stove including a grate, a hearth disposed to receive ashes falling through the grate and provided in the bottom wall thereof with a discharge opening, said wall being formed with notches at the ends of said opening, a removable ash pan disposed to receive ashes discharged through said opening and provided with an inner end wall, and a door provided with ears overlying the bottom wall of the hearth and with lugs projecting through said notches for swingingly supporting the door on the bottom wall of the hearth, said lugs projecting beneath said bottom wall when the door is open for engagement by the inner end wall of the pan as the pan is removed for swinging the door to closed position overlying said opening.

2. A stove including a grate, a hearth disposed to receive ashes falling through the grate and having a bottom and front wall, the bottom being formed with a discharge opening adjacent the front wall, a removable ash pan mounted for sliding movement in a single horizontal plane beneath the discharge opening and held against vertical movement, and a door having one end thereof pivotally mounted on the hearth at the front end of said discharge opening and having its upper end resting against the front wall when raised to an open position, said door being provided at its pivoted end with abutment means extending downwardly through the opening into the path of movement of the pan when the door is in an open position and engageable by said pan for automatically closing the door upon removal of said pan, said abutment means moving upwardly out of the path of the pan when the door is closed.

3. In a stove including a grate, a hearth disposed to receive ashes falling through the grate and provided with a discharge opening in its bottom, a removable ash pan mounted for sliding movement in a single horizontal plane beneath the discharge opening and held against vertical movement, and a door pivoted at one end upon the hearth at one end of the discharge opening for vertical swinging movement and provided at its pivoted end with lugs depending through said opening into the path of the inner end wall of the pan and engageable by said wall to swing the door downwardly to close the opening when the pan is withdrawn, said door when closed resting upon the hearth with the lugs extending horizontally beneath the hearth out of the path of movement of the inner end wall of the ash pan.

4. In a stove including a grate, a hearth disposed to receive ashes falling through the grate and provided in the bottom thereof with a discharge opening, tracks mounted at opposite sides of the hearth, a removable ash pan having end walls and side walls engaging said tracks to slidably mount the pan for movement in a single horizontal plane beneath the hearth and hold the pan against vertical movement while under the hearth, the rear wall being of a height to pass under the hearth, and a door having one end thereof pivotally mounted on the hearth at the front end of said discharge opening and provided at its pivoted end with depending lugs extending in the path of movement of the rear end wall of the pan when the door is in open position and engageable by the rear wall of the pan for automatically closing the door upon sliding of said pan from beneath the hearth.

JAMES CLEVA GLENN.